US009881071B2

(12) United States Patent
Slavicek et al.

(10) Patent No.: US 9,881,071 B2
(45) Date of Patent: Jan. 30, 2018

(54) TRANSPORT LAYER ABSTRACTION FOR CLUSTERING IMPLEMENTATION

(71) Applicant: Red Hat, Inc., Raleigh, NC (US)

(72) Inventors: Pavel Slavicek, Brno (CZ); Rostislav Svoboda, Slapanice (CZ)

(73) Assignee: Red Hat, Inc., Raleigh, NC (US)

( * ) Notice: Subject to any disclaimer, the term of this patent is extended or adjusted under 35 U.S.C. 154(b) by 664 days.

(21) Appl. No.: 14/301,109

(22) Filed: Jun. 10, 2014

(65) Prior Publication Data

US 2015/0356161 A1 Dec. 10, 2015

(51) Int. Cl.
*G06F 17/30* (2006.01)

(52) U.S. Cl.
CPC .. *G06F 17/30575* (2013.01); *G06F 17/30312* (2013.01); *G06F 17/30598* (2013.01)

(58) Field of Classification Search
CPC ........ G06F 17/30312; G06F 17/30575; G06F 17/30598
USPC .......................... 707/636–638, 610, 673, 737
See application file for complete search history.

(56) References Cited

U.S. PATENT DOCUMENTS

| | | | |
|---|---|---|---|
| 6,192,417 B1 | 2/2001 | Block et al. | |
| 7,124,211 B2 | 10/2006 | Dickson et al. | |
| 7,206,836 B2 | 4/2007 | Dinker et al. | |
| 7,483,374 B2 | 1/2009 | Nilakantan et al. | |
| 7,565,661 B2 | 7/2009 | Sim-Tang | |
| 7,779,063 B2 | 8/2010 | Gebhart et al. | |
| 7,830,838 B2 | 11/2010 | Kohvakka et al. | |
| 8,059,527 B2 | 11/2011 | Townsley et al. | |
| 8,078,816 B1* | 12/2011 | Thoppai | G06F 17/30215 711/162 |
| 8,214,529 B2 | 7/2012 | Kanevsky et al. | |
| 8,874,850 B1* | 10/2014 | Goodson | G06F 12/0875 711/133 |
| 8,997,096 B1* | 3/2015 | Protopopov | G06F 9/45558 709/201 |
| 9,015,123 B1* | 4/2015 | Mathew | G06F 17/30174 707/646 |
| 9,519,664 B1* | 12/2016 | Kharatishvili | G06F 17/30321 |
| 2004/0153558 A1* | 8/2004 | Gunduc | G06F 9/5055 709/229 |

(Continued)

OTHER PUBLICATIONS

High-Availability Cluster, Wikipedia, 4 pages, retrieved on May 31, 2014 from http://en.wikipedia.org/wiki/High-availability_cluster.

(Continued)

*Primary Examiner* — Hanh Thai
(74) *Attorney, Agent, or Firm* — Haynes and Boone, LLP

(57) ABSTRACT

Systems and methods are disclosed for replicating data. An example method includes receiving at a server a current data index and current data. The server is coupled to a first node and a second node, and the current data is responsive to a request from a client. The method also includes replicating the current data and the current data index to the second node. The method further includes receiving at the server a heartbeat message including the current data index and a client identifier. The heartbeat message is from the second node, and the client identifier identifies the client. The method also includes in response to receiving the heartbeat message, sending a notification indicating that the current data has been replicated to the second node to a load balancer.

20 Claims, 7 Drawing Sheets

(56) References Cited

U.S. PATENT DOCUMENTS

| | | | | |
|---|---|---|---|---|
| 2007/0226359 A1* | 9/2007 | Gunduc | ................ | G06F 9/5055 709/229 |
| 2012/0197868 A1* | 8/2012 | Fauser | .............. | G06F 17/30286 707/714 |
| 2012/0221534 A1* | 8/2012 | Gao | .................. | G06F 17/30312 707/692 |
| 2013/0041872 A1* | 2/2013 | Aizman | ............ | G06F 17/30194 707/690 |
| 2013/0166556 A1* | 6/2013 | Baeumges | ........ | G06F 17/30339 707/737 |
| 2013/0332484 A1* | 12/2013 | Gajic | ................ | G06F 17/30286 707/770 |
| 2014/0067772 A1* | 3/2014 | Sabbouh | ........... | G06F 17/30312 707/690 |
| 2015/0293989 A1* | 10/2015 | Bhargava | .......... | G06F 17/30598 707/737 |

OTHER PUBLICATIONS

Haowen Chan et al., ACE: An Emergent Algorithm for Highly Uniform Cluster Formation, Carnegie Mellon University, retrieved on Jun. 10, 2014 from http://www.cs.cmu.edu/afs/cs.cmu.edu/Web/People/haowen/ewsn04_Chan_ACE.pdf, 16 pages, Pittsburgh, PA, 15213 USA.

Jong-Myoung Kim et al., CHEF: Cluster Head Election Mechanism Using Fuzzy Logic in Wireless Sensor Networks, Feb. 17-20, ICACT, 2008,; pp. 654-659, Copyright 2014, IEEE.

* cited by examiner

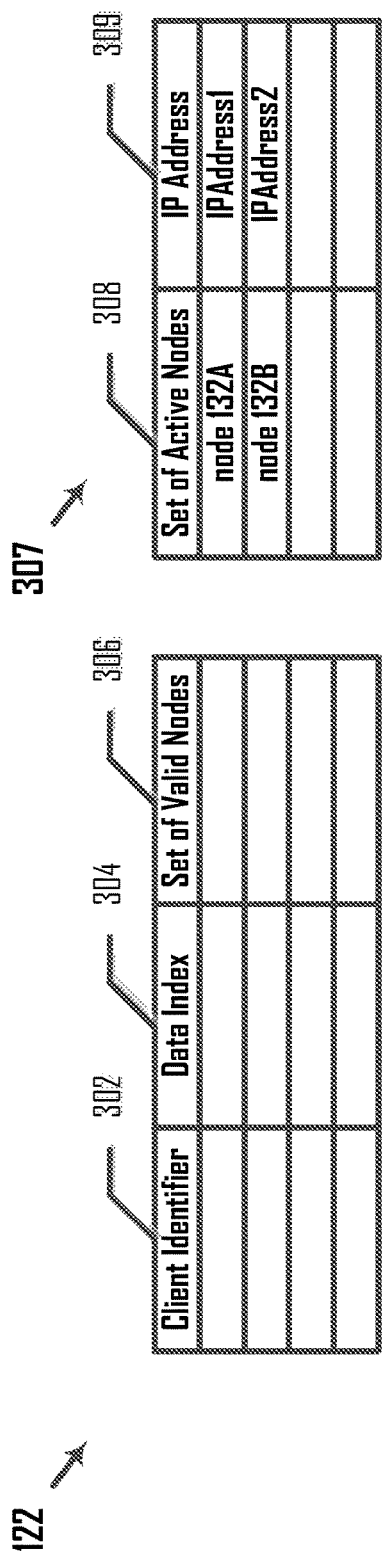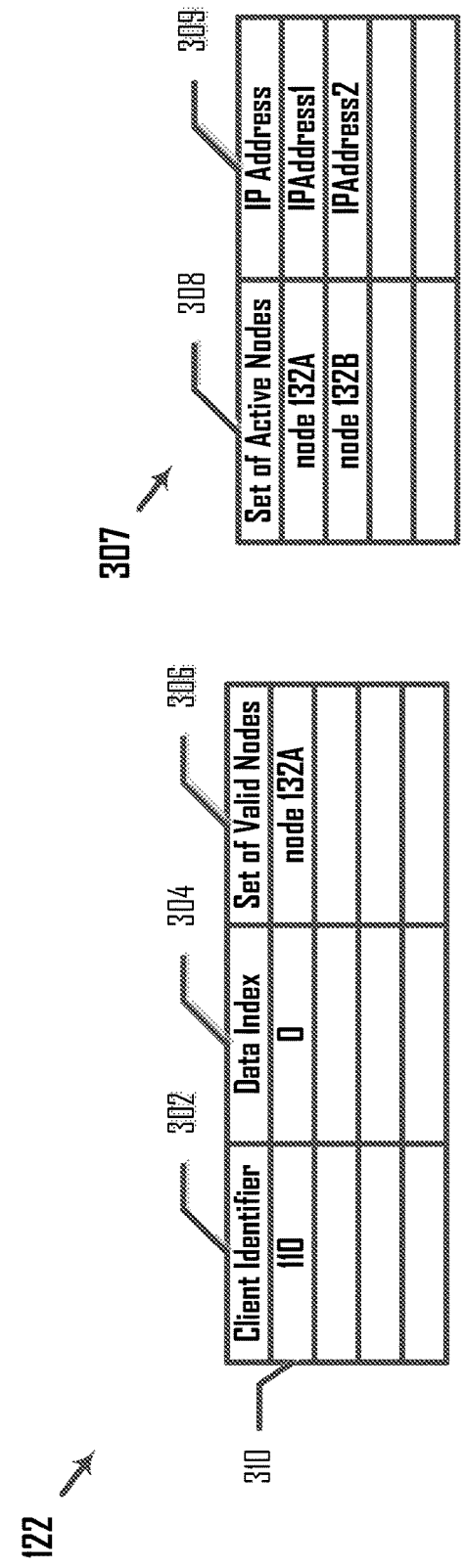

TRANSPORT LAYER ABSTRACTION FOR CLUSTERING IMPLEMENTATION

BACKGROUND

The present disclosure generally relates to computing devices, and more particularly to replicating data in a cluster.

High availability (HA) is one of the basic requirements for nowadays enterprise applications. Enterprise systems operating today are subject to continuous program execution, that is 24 hours a day and 7 days a week. The concept of "overnight" or "planned downtime" no longer exists because businesses want programs and data to be available at any point during the day and night. Any outages or deteriorated service can result in loss of revenue as customers simply take their business elsewhere, and the enterprise stops to function on a global scale. High availability may be provided to an application when it is able to survive, for example, a crash on the repository server that stores data for the application.

A cluster is a set of application server instances configured to act in concert to deliver greater scalability and availability than a single instance can provide. Database vendors may use several different strategies to implement high availability for a data storage system. The implementation of high availability for data storage is a complex technical problem and uses strategies that typically require special and expensive hardware or a special configuration of databases that brings limitations for the provided features.

A traditional approach of providing high availability to an application uses a storage area network (SAN). A SAN is a high performance dedicated network used primarily to provide fast and reliable communication between computers and storage devices in a shared storage networking environment. The SAN also enables a storage device to communicate with another storage device. Software solutions at the repository level, however, are complex and expensive. For example, a repository within a cluster may be a "share everything" repository in which all data files, control files, and redo log files used by the repository reside on a shared storage that is accessible by all other repository instances. This traditional approach is typically expensive and proprietary. The implementation of high availability in the Enterprise Java world, for example, is based on using a cluster of application servers and on data redundancy within this cluster. This solution may require intensive communication between nodes in the cluster and/or complex algorithms to ensure data integrity.

BRIEF SUMMARY

This disclosure relates to data replication. Methods, systems, and techniques for replicating data in a cluster are provided.

According to an embodiment, a method of replicating data includes receiving at a server a current data index and current data. The server is coupled to a first node and a second node. The current data is responsive to a request from a client. The method also includes replicating the current data and the current data index to the second node. The method further includes receiving at the server a heartbeat message including the current data index and a client identifier. The heartbeat message is from the second node. The client identifier identifies the client. The method also includes in response to receiving the heartbeat message, sending a notification indicating that the current data has been replicated to the second node to a load balancer.

According to another embodiment, a system for replicating data includes a cluster including a first node and a second node. The first node manages a first repository that is local to the first node. The second node manages a second repository that is local to the second node. The system also includes a load balancer that receives one or more heartbeat messages. The system further includes a distribution center including one or more servers coupled to one or more nodes in the cluster. A server in the distribution center receives a current data index and current data from the first node, replicates the current data and the current data index to the second node, and receives a heartbeat message including the current data index and a client identifier from the second node. The current data is responsive to a request from a client that is identified by the client identifier. Further, in response to receiving the heartbeat message, the distribution center sends a notification indicating that the current data has been replicated to the second node to the load balancer.

According to another embodiment, a non-transitory machine-readable medium includes a plurality of machine-readable instructions that when executed by one or more processors are adapted to cause the one or more processors to perform a method including: receiving at a server a current data index and current data, the server being coupled to a first node and a second node, and the current data being responsive to a request from a client; replicating the current data and the current data index to the second node; receiving at the server a heartbeat message including the current data index and a client identifier, the heartbeat message being from the second node, and the client identifier identifying the client; and in response to receiving the heartbeat message, sending a notification indicating that the current data has been replicated to the second node to a load balancer.

BRIEF DESCRIPTION OF THE DRAWINGS

The accompanying drawings, which form a part of the specification, illustrate embodiments of the invention and together with the description, further serve to explain the principles of the embodiments. In the drawings, like reference numbers may indicate identical or functionally similar elements. The drawing in which an element first appears is generally indicated by the left-most digit in the corresponding reference number.

FIGS. 3A-3F are example index tables.

Figure 1:
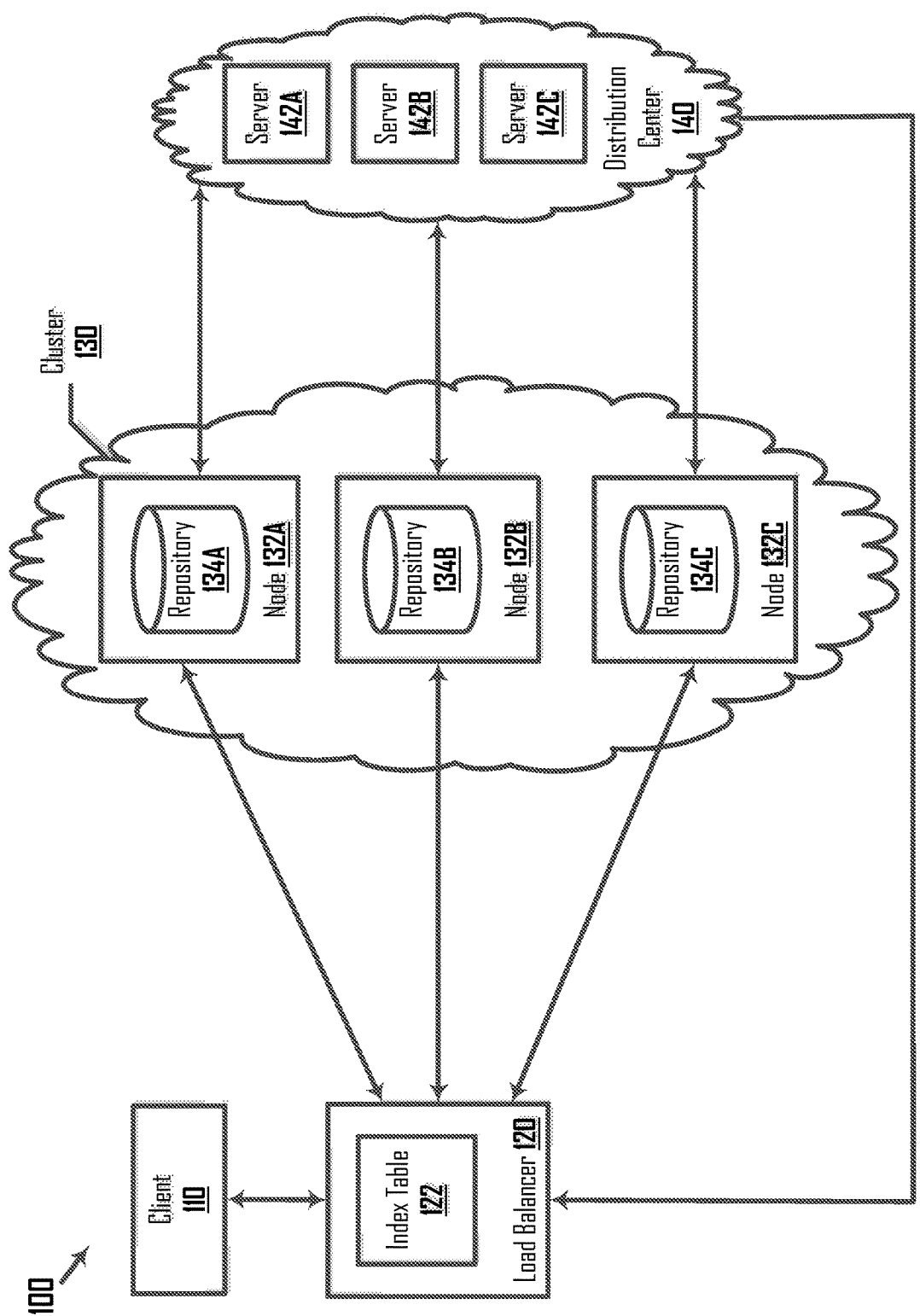
FIG. 1 is a block diagram illustrating a system for replicating data in a cluster including a plurality of nodes, according to an embodiment.

Embodiments of the present disclosure and their advantages are best understood by referring to the detailed description that follows. It should be appreciated that like reference numerals are used to identify like elements illustrated in one or more of the figures. The drawing in which an element first appears is generally indicated by the left-most digit in the corresponding reference number.

DETAILED DESCRIPTION

I. Overview
II. Example System Architecture
III. Data Replication in a Cluster
  A. Select a Node in the Cluster to Process a Client Request from a Client that is Not in the Index Table
    1. Index Table
    2. Send Request to Selected Node for Processing
  B. The Selected Node Performs a Transaction
    1. Process the Client Request
    2. Update the Data Index
    3. Send the Current Data and Current Data Index to the Load Balancer
    4. Send the Current Data and Current Data Index to the Distribution Center to Replicate
  C. Distribution Center Replicates Data and Informs the Load Balancer
  D. Select a Node in the Cluster to Process a Client Request from a Client that is in the Index Table
IV. Cluster Topology
  A. New Node is Attached to the Cluster
  B. Load Balancer Looses Connection with Node in the Cluster
V. Example Method
VI. Example Computing System

I. Overview

It is to be understood that the following disclosure provides many different embodiments, or examples, for implementing different features of the present disclosure. Some embodiments may be practiced without some or all of these specific details. Specific examples of components, modules, and arrangements are described below to simplify the present disclosure. These are, of course, merely examples and are not intended to be limiting.

A foundation of providing a cluster of application servers that provides high availability is the transport layer. The transport layer provides data replication and information exchange between nodes in the cluster. It may be desirable for the transport layer to implement a reliable way for data replication and information exchange between nodes in the cluster.

A cluster of application servers may offer two modes of data replication. In a synchronous mode data is replicated synchronously, which means that data is replicated before business operations are finished. Although a cluster in synchronous mode represents a reliable way for data persistent replication, synchronous replication may have a negative impact on overall performance. In an asynchronous mode data is replicated asynchronously, which means that data is replicated after business operations are finished. Although a cluster in asynchronous mode has a good overall performance the asynchronous mode does not guarantee reliable data replication. The present disclosure introduces a balance between reliability and performance of data replication. In an embodiment, data is replicated asynchronously and the system guarantees reliable data delivery.

Additionally, it may be desirable for the transport layer to be able to work in different environments. A clustering implementation may deal with many complex situations such as various sizes and different structures of replicated data, complex routing routines, unreliable communication channels, etc. A target environment (e.g., production environment) may have some limitations. For example, a target environment may have a restriction that prohibits multicast communication. In such an example, the transport layer for clustering becomes even more complex.

The present disclosure introduces techniques to hide details of the used environment and used protocols and may remove the interaction between nodes in the cluster, thus reducing the complexity of the clustering mechanism. For example, it may be unnecessary for nodes in the cluster to communicate with each other. In another example, a software-level mechanism provides an abstraction of the transport layer that is used for clustering. Additionally, special hardware or special equipment may be unnecessary to implement the techniques provided in the present disclosure.

II. Example System Architecture

FIG. 1 is a block diagram 100 illustrating a system for replicating data in a cluster including a plurality of nodes, according to an embodiment. Diagram 100 includes a client 110, a load balancer 120, a cluster 130 of nodes 132A-132C, and a distribution center 140. Each of nodes 132A-132C may be a server with an independent repository, and nodes 132A-132C may be deployed as a cluster with cluster continuous replication. Node 132A is coupled to a repository 132A, which is local to node 132A and is managed by node 132A. Node 132B is coupled to a repository 132B, which is local to node 132B and is managed by node 132B. Node 132C is coupled to a repository 132C, which is local to node 132C and is managed by node 132C. Although cluster 130 is illustrated as including three nodes, this is not intended to be limiting and cluster 130 may include two or more nodes.

Each of client 110, load balancer 120, nodes 132A-132C, and distribution center 140 may be implemented on a computing device that includes a memory and a processor. Additionally, each of client 110, load balancer 120, nodes 132A-132C, and distribution center 140 may be coupled to a network. For example, each of load balancer 120, nodes 132A-132C, and distribution center 140 may be implemented on different computing devices and may be separated by the network. The network may include various configurations and use various protocols including the Internet, World Wide Web, intranets, virtual private networks, wide area networks, local networks, private networks using communication protocols proprietary to one or more companies, cellular and other wireless networks, Internet relay chat channels (IRC), instant messaging, simple mail transfer protocols (SMTP), Ethernet, WiFi and Hypertext Transfer Protocol (HTTP), and various combinations of the foregoing.

Cluster 130 is a high-availability cluster that provides high availability for applications and data redundancy. Distribution center 140 coordinates the replication and distribution of data to one or more nodes in cluster 130 (e.g., via a messaging application programming interface (API)) and provides information about data distribution in cluster 130 to load balancer 120. Nodes 132A-132C in cluster 130 communicate with distribution center 140 and load balancer 120. Nodes 132A-132C send and receive replicated data via distribution center 140 and also send heartbeat messages to load balancer 120 via distribution center 140. A heartbeat message is used to monitor the health and status of nodes in a cluster. As will be further discussed below, a heartbeat message may include the node's address. A node may send a heartbeat message when it joins cluster 130. Additionally, distribution center 140 may replicate current data associated with a client to a node in cluster 130. To indicate that the node has stored the current data and is ready to process requests associated with the current data, the node may send a heartbeat message including a client identifier that identifies the client and a current data index that is associated with the current data, as will be explained further below. Load balancer 140 uses the received data to build an index table 122 that is used for request balancing and detection of dynamic reconfiguration of cluster 130.

In the example illustrated in FIG. 1, distribution center 140 is designed as a service with high availability and includes a plurality of servers including server 142A, server 142B, and server 142C. In such an example, distribution center 140 does not represent a single point of failure and is a system with high availability. Distribution center 140 may simplify node implementation because, for example, it may be unnecessary for nodes 132A-132C in cluster 130 to implement complex routines for routing. In an example, nodes in cluster 130 do not directly communicate with each other and do not actively control replication of data between themselves. Rather, the nodes in cluster 130 communicate directly with distribution center 140 and load balancer 120, and distribution center 140 coordinates the replication and distribution of data to one or more nodes in cluster 130. In such an example, it may be unnecessary for a node in cluster 130 to control distribution of replicated data in cluster 130 or to maintain any kind of information about the other nodes in cluster 130.

Performance and reliability of the data replication in a cluster are important characteristics of a clustering implementation. The cluster may be in a synchronous mode that provides reliable replication or in asynchronous mode that provides fast data replication with high data throughput. In an embodiment, the system in FIG. 1 provides asynchronous data replication where all data exchange events are executed within a single transaction. In such an embodiment, data replication may be asynchronous while providing reliable delivery of the data to other nodes in cluster 130. Additionally, distribution center 140 and load balancer 120 may remove the hard binding between concrete clustering implementations and communication protocols and data formats used for data replication and communication within the cluster, as will be described in further detail below. For example, the system in FIG. 1 may be robust enough to provide good performance and reliability and may be suitable for geographical clusters.

III. Data Replication in a Cluster

Figure 2:
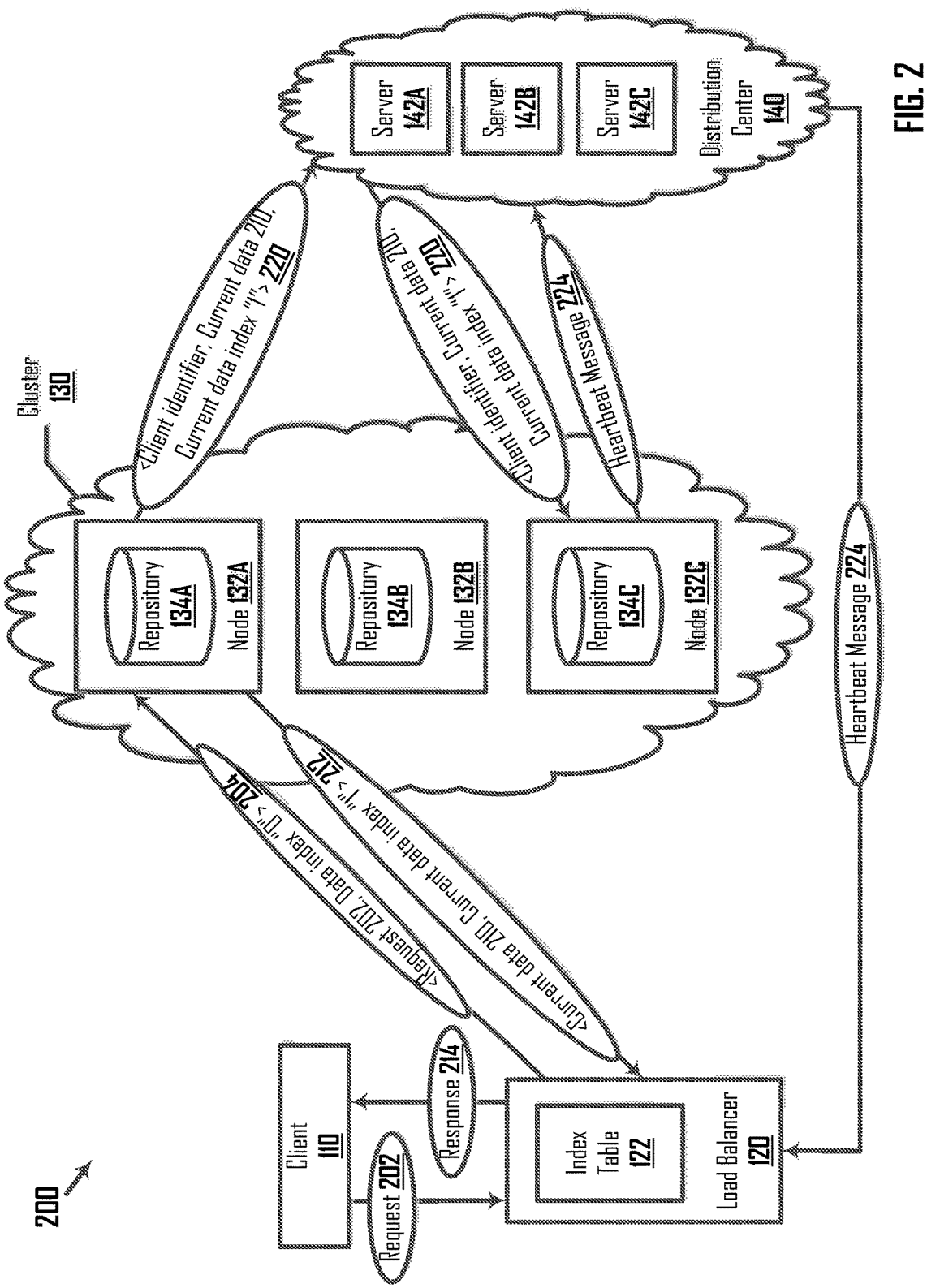
FIG. 2 is a process flow diagram illustrating the replication of data in a cluster including a plurality of nodes, according to an embodiment.

FIG. 2 is a process flow diagram 200 illustrating the replication of data in a cluster including a plurality of nodes, according to an embodiment.

A. Select a Node in the Cluster to Process a Client Request from a Client that is Not in the Index Table In the example illustrated in FIG. 2, client 110 sends a request 202 for processing by a node in cluster 130. Load balancer 120 receives request 202 and selects a node in cluster 130 to which to forward request 202 for processing. Load balancer 120 and one or more nodes in cluster 130 may be coupled via a communication protocol. In an example, the communication protocol is a unified communication protocol such as HTTP.

1. Index Table

In an embodiment, load balancer 120 uses index table 122 to select the node to which to forward request 202 for processing. Load balancer 120 maintains index table 122, which includes information about the data index for concrete clients and details regarding which nodes in cluster 130 are capable of processing requests from particular clients. FIGS. 3A-3F are example index tables, and the description below will refer to FIGS. 2 and 3A-3F together to explain in further detail how distribution center 140 replicates data to one or more nodes in cluster 130.

Figure 3C:
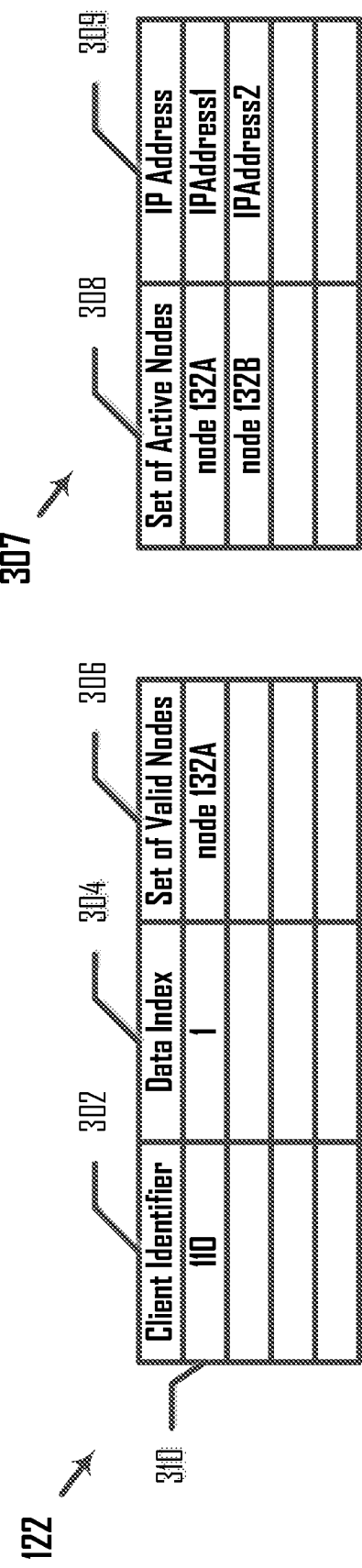

In the example illustrated in FIG. 3A, index table 122 includes a column "Client Identifier" 302, column "Data Index" 304, and column "Set of Valid Nodes" 306. Each entry in index table 122 includes an association between a client identifier, a data index, and a set of valid nodes in the cluster. Column "Client Identifier" 302 stores a client identifier that identifies a particular client. Column "Data Index" 304 stores a data index that indicates a version of data that is processed in response to a client request. The data index assists load balancer 120 in selecting a node that is valid and that stores the most current data for processing requests from a client. The data index may enable processing of data replication messages asynchronously. Column "Set of Valid Nodes" 306 identifies a set of valid nodes in cluster 130 that is capable of serving requests from the associated client. The set of valid nodes stores the most current data corresponding to the current data index that is associated with the client. As such, index table 122 indicates which nodes are the most recent nodes to have processed business logic associated with a client from load balancer 120's perspective. The columns illustrated in FIGS. 3A-3F are not intended to be limiting and index table 122 may include more and/or different columns.

FIG. 3A also includes a table 307 that includes a column "Set of Active Nodes" 308 and a column "IP Address" 309. Column "Set of Active Nodes" 308 identifies a set of active nodes in cluster 130. The set of active nodes includes nodes that are alive and able to receive messages. A heartbeat message is an indication that the node is still active. In an example, load balancer 120 receives a heartbeat message from a node via distribution center 140. In response to receiving the heartbeat message, load balancer 120 may identify the node as being in the set of active nodes by updating column "Set of Active Nodes" 308 to include the node. In an example, load balancer 120 inserts the node's name or node identifier into column "Set of Active Nodes" 308.

Column "IP Address" 309 includes information about the nodes' addresses. For example, column "IP Address" 309 stores a node's IP address. In an example, load balancer 120 inserts the node's IP address into column "IP Address" 309 in response to receiving the heartbeat message from the node via distribution center 140, as will be explained further below. The IP address of node 132A is "IPAddress1", and the IP address of node 132B is "IPAddress2". Although column "IP Address" 309 is illustrated as including a node's IP address, this is not intended to be limiting. For example, column "IP Address" 309 may include the node's Media Access Control (MAC) address. Although tables 122 and 307 are illustrated as being different tables, they may combined into a single table.

In FIG. 3A, load balancer 120 has already received heartbeat messages from nodes 132A and node 132B via distribution center 140 because these nodes are identified as being active nodes in column "Set of Active Nodes" 308. Accordingly, nodes 132A and 132B are active nodes in cluster 130 and able to process requests. Additionally, load balancer 120 may use the information included in a heartbeat message to select a node for a new request from a client.

A heartbeat message may include information about system load and the health of a node.

Load balancer 120 maintains index table 122 and determines whether a node in cluster 130 has previously processed requests from client 110. Client 110 may send request 202, which includes a client identifier "110" associated with client 110 or provides an indication to load balancer 120 as to client 110's client identifier. Load balancer 120 identifies the client identifier associated with client 110 and searches index table 122 for the client identifier. In response to determining that index table 122 includes the client identifier "110", load balancer 120 may select a node in the set of valid nodes associated with the client to which to forward request 202.

In an example, client 110's client identifier is "110". In FIG. 3A, index table 122 does not include the client identifier "110". Index table 122 may not include client 110's client identifier because, for example, client 110 is a new client and no nodes in cluster 130 have processed data for client 110 yet. In response to determining that index table 122 does not include the client identifier "110", load balancer 120 may select a node in the set of active nodes and set the data index that is associated with the client identifier to a default value. In an example, the default value is zero. Although the default value is described as being zero, the default value may be any value.

In response to determining that index table 122 does not include the client identifier "110", load balancer 120 may select, based on index table 122, an active node in cluster 130 to process request 202. Load balancer 120 may use various techniques to select the most suitable active node to process request 202. For example, load balancer 120 may select the active node having the lowest utilization rate in cluster 130. In another example, load balancer 120 selects the active node that is closest in proximity to client 110 in cluster 130. In another example, load balancer 120 selects the active node based on a load of the active nodes. If load balancer 120 determines that there is no suitable active node available, load balancer 120 may hold client 110's request 202 for a period of time and retry to select the most suitable active node in cluster 130 to process request 202. After a threshold number of retries, load balancer 120 may return an error message to client 110.

2. Send Request to Selected Node for Processing

In the example illustrated in FIG. 2, load balancer 120 selects node 132A from the set of active nodes as the node to process request 202. Load balancer 120 sends a message 204 to the selected node. Message 204 includes request 202 and the data index "0".

FIG. 3B illustrates index table 122 having an entry 310 that associates client identifier "110" with the data index "0" and the set of valid nodes including node 132A, according to an embodiment. Load balancer 120 may insert the client identifier "110" in column "Client Identifier" 302, the default data index "0" in column "Data Index" 304, and "node 132A" in column "Set of Valid Nodes" 306 in index table 122.

B. The Selected Node Performs a Transaction

In response to receiving message 204, the selected node may perform a transaction to prevent data loss from occurring based on the processing of request 202 and to ensure that data is properly replicated to one or more other nodes in cluster 130. Node 132A may perform the transaction of processing request 202 by determining and storing a result of request 202 in repository 132A, updating the data index to a current data index and storing it in repository 132A, sending a message including a result of request 202 and the current data index to load balancer 120, and sending a message including the result of request 202 and the current data index to distribution center 140.

1. Process the Client Request

Node 132A may identify request 202 in message 204 and start the transaction by executing business logic to process request 202. Business logic may include code that node 132A executes in order to retrieve the result of request 202. Current data 210 may be the result of processing request 202. In an example, request 202 is a query and node 132A executes the query against repository 134A to obtain a result of the query. In such an example, current data 210 may be the result of the query. After node 132A has finished processing request 202, node 132A may store current data 210 based on processing request 202 in repository 132A. Accordingly, node 132A now stores the most current data associated with client 110.

2. Update the Data Index

During the transaction, node 132A also updates the data index "0" in the message received from load balancer 120 to a new value, which becomes the current data index. The current data index corresponds to the current data based on processing request 202. The data index enables the asynchronous replication of data to take place because the data index corresponds to the most up-to-date data. Each business operation that is executed by a client may change the data. Accordingly, it is desirable that the next request sent from the client is served by a node with the current data rather than by a node with stale data. Each time a particular node processes data based on a request from client 110, the particular node updates the data index to reflect that the node has the current data and is the last node to have processed data for client 110.

A node that executes a business operation based on a client's request updates the data index. Node 132A may update the data index using various techniques. In an example, the data index is a sequential number that represents the version of processed data. In such an example, node 132A may increment the data index of "0" to a current data index of "1", which is associated with current data 210. In another example, node 132A multiplies the data index by a number to obtain the current data index. Other ways to update the data index are within the scope of the disclosure.

3. Send the Current Data and Current Data Index to the Load Balancer

During the transaction, node 132A sends a message 212 to load balancer 120. Message 212 includes current data 210 and the current data index "1". Load balancer 120 receives message 212. Node 132A sends message 212 to load balancer 120 so that load balancer 120 can return current data 210 to client 110. In response to receiving message 212, load balancer 120 returns a response 214 to client 110. Response 214 includes current data 210 and is responsive to request 202.

Node 132A sends the current data index to load balancer 120 so that load balancer 120 can update index table 122 and select the node as a valid node for processing requests from the client. Load balancer 120 updates the data index in index table 122 with the current data index included in message 212 in order to assist load balancer 120 in selecting a valid node with the most current data for processing requests from client 110.

FIG. 3C illustrates index table 122 with updated entry 310, according to an embodiment. In the example illustrated in FIG. 3C, load balancer 120 has updated the data index in column "Data Index" 304 of entry 310 with the current data index "1" included in message 212. Accordingly, client 110 is associated with the data index "1" and node 132A is a valid node that stores the most current data associated with client 110. As indicated by index table 122 in FIG. 3C, node 132A is the only valid node that can serve a request from client 110.

If client 110 sends another request, node 132A may be selected by load balancer 120 to process the request because node 132A stores the most current data in association with client 110. In keeping with the example in which a node increments the data index by one each time the node processes data, the set of valid nodes associated with the data index with the largest value stores the most current data. The data index enables load balancer 120 to keep track of nodes that have the most current data associated with client 110. For example, if a node were to send a data index of "1", load balancer 120 may look in index table 122 and determine that the current data index is "2", which is greater than "1". Accordingly, load balancer 120 may determine that the node sent stale data because the data index associated with the data is not the most up-to-date. Accordingly, if a node processes a request for client 110 and returns data along with a data index having a value that is less than the current data index in index table 122, load balancer 120 may determine that the data from the node is stale.

4. Send the Current Data and Current Data Index to the Distribution Center to Replicate During the transaction, node 132A also sends a data message 220 to distribution center 140. A data message may be used for data replication in cluster 130. Data message 220 includes client identifier "110" associated with request 202, current data 210 based on processing request 202, and the current data index "1". After node 132A stores current data 210 in repository 132A, sends message 212 to load balancer 120, and sends data message 220 to distribution center 140, the transaction is complete. Performing these actions within a single transaction may ensure that no data will be lost. Additionally, it may be unnecessary for nodes in cluster 130 to interact directly because distribution center 140 is responsible for the data replication in cluster 130. For example, distribution center 140 may use data message 220 to replicate the current data stored at node 132A to one or more nodes in cluster 130.

In an example, distribution center 140 is represented by a system that implements a messaging API. The messaging API may be a standard messaging API. Accordingly, distribution center 140 may provide an abstraction for the transport layer because distribution center 140 provides a unified API for nodes in cluster 130 to communicate with distribution center 140, which coordinates the replication and distribution of data. This approach may reduce the complexity of the transport layer implementation on the node. Additionally, multicast communication may be used. For example, distribution center 140 may communicate with nodes in cluster 130 via multicast communication. In such an example, distribution center 140 may send a multicast communication to a plurality of nodes in cluster 130 to replicate current data associated with a client.

In an example, the messaging API is the Java Messaging System (JMS) API, and distribution center 140 is based on the JMS subsystems. In such an example, one or more servers (e.g., servers 142A, 142B, or 142C) in distribution center 140 and one or more nodes in cluster 130 communicate using JMS. Distribution center 140 may provide at least two JMS topics. A first JMS topic may be for data exchange and a second JMS topic may be for heartbeat messages. Nodes in cluster 130 and load balancer 140 may communicate with the JMS subsystem via the standardized JMS API. The servers in distribution center 140 may implement the JMS API, and nodes in cluster 130 may behave like standard messaging clients for distribution center 140. In an example, a node in cluster 130 communicates with server 142A in distribution center 140 via JMS API and invokes one or more APIs at server 142A. JMS is provided merely as an example, and other messaging services may be used such as International Business Machine (IBM)® WebSphere Message Queue, etc.

C. Distribution Center Replicates Data and Informs the Load Balancer

Distribution center 140 sends data updates to one or more nodes in cluster 130 and coordinates the replication of current data 210 to one or more nodes in cluster 130. In some embodiments, one or more nodes in cluster 130 may request data updates from distribution center 140. After node 132A stores current data 210 in repository 132A, node 132A sends data message 220 to distribution center 140. To replicate data, distribution center 140 sends a data message to one or more other nodes in cluster 130, where the message includes the current data and current data index. In an example, distribution center 140 replicates current data 210 and current data index "1" to node 132C in cluster 130 by forwarding data message 220 to node 132C. Node 132C receives data message 220 and stores current data 210 (included in data message 220) in repository 132C. Node 132C may also store the current index "1" in repository 132C.

After node 132C stores current data 210 in repository 132C, node 132C may send a heartbeat message 224 to distribution center 140 to indicate to distribution center 140 that current data 210 has been successfully stored in repository 132C and node 132C is ready to process requests from client 110. A heartbeat message is an acknowledgement from a node that the current data has been stored at the repository local to the node and that the node is ready to process requests from a client that is associated with the current data index. As such, heartbeat message 224 is an indication that node 132C is in synchronization with node 132A and they both store current data 210. A heartbeat message received from a node may include the current data index, the client identifier associated with the current display, the node's address (e.g., IP address or MAC address), and/or information about the node's status (e.g., hardware utilization).

Distribution center 140 receives heartbeat message 224. In response to receiving heartbeat message 224, distribution center 140 may send one or more nodes in cluster 130 a notification indicating that the current data corresponding to the data index has been replicated to the node. In an example, distribution center 140 sends the notification by forwarding heartbeat message 224 to load balancer 120. Distribution center 140 may replicate heartbeat message 224 to load balancer 120 in a different transaction from the transaction in which node 132A stores current data 210 in repository 132A, sends message 212 to load balancer 120, and sends data message 220 to distribution center 140. Accordingly, the exchange of data that is performed in these two transactions can be done asynchronously.

Load balancer 120 may receive heartbeat message(s) from one or more nodes passed through distribution center 140. From a heartbeat message, load balancer 120 receives information about current cluster topology, data distribution in cluster 130, current load and status of the nodes (e.g., health of nodes in the cluster), and new nodes in the cluster. Load balancer 120 updates index table 122 with the information in heartbeat message 224. In an example, load balancer 120 updates the set of active nodes associated with the client in column "Set of Active Nodes" 308 to include the node that sent heartbeat message 224 along with column "IP Address" 309 to include the node's IP address. Load balancer 120 also updates the set of valid nodes in column "Set of Valid Nodes" 306 to reflect that node 132C stores the most current data associated with client 110.

Figure 3D:
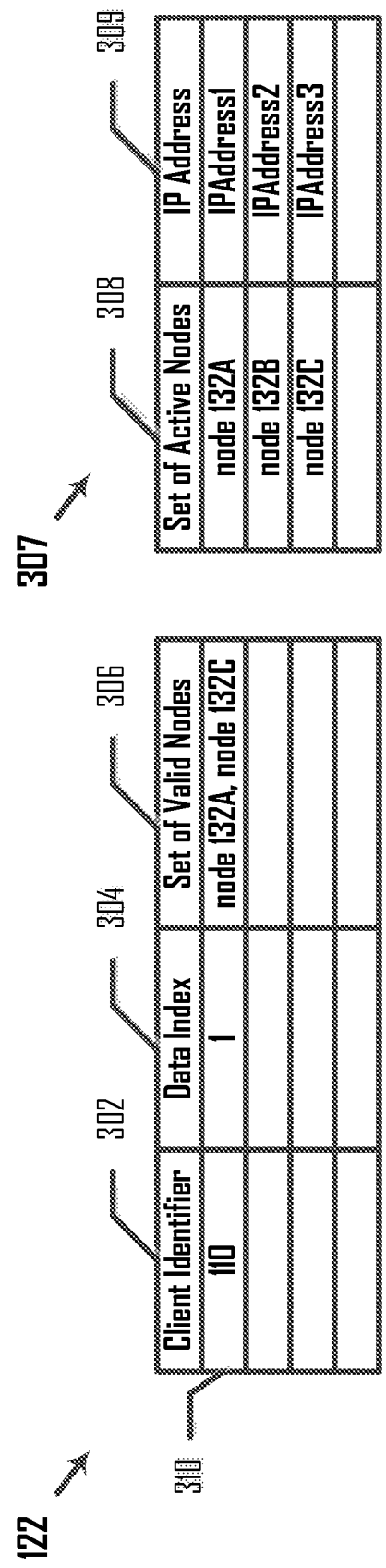

FIG. 3D illustrates index table 122 with an updated entry 310 and table 307 with an updated entry based on the heartbeat message from node 132C, according to an embodiment. In FIG. 3D, column "Set of Valid Nodes" 306 stores nodes 132A and 132C, which indicate that these nodes store the most current data associated with client 110 and may be selected to process requests from client 110. Additionally, in table 307, column "Set of Active Nodes" 308 stores node 132C and column "IP Address" 309 stores node 132C's IP address. Table 307 indicates that nodes 132A-132C are all active nodes in cluster 130. Load balancer 120 may update index table 122 and table 307 accordingly. If client 110 sends another request, load balancer 120 is able to select either node 132A or node 132C, which contain the current data associated with client 110, to service the request.

D. Select a Node in the Cluster to Process a Client Request from a Client that is in the Index Table If client 110 sends another request for processing by a node in cluster 130, load balancer 120 may search index table 122 in FIG. 3D for client identifier "110", which is in entry 310. Load balancer 120 searches index table 122 to find the most current data index (or last data index) in index table 122 that corresponds to the client's client identifier. In response to determining that index table 122 includes the client identifier "110", load balancer 120 may select a node in column "Set of Valid Nodes" 306 to which to forward the request 202. Accordingly, load balancer 120 may select either node 132A or node 132C to process the request. In an example, load balancer 120 selects node 132C to process the request. In such an example, load balancer 120 sends a message including the request and the current data index "1". Load balancer 120 may use various techniques to select the most suitable valid node to process the request. For example, load balancer 120 may select the valid node having the lowest utilization rate in cluster 130. In another example, load balancer 120 selects the valid node that is closest in proximity to client 110 in cluster 130. In another example, load balancer 120 selects the valid node based on a load of the valid nodes.

Node 132C may receive the message and perform the transaction of processing the request by determining and storing a result of the request in repository 132C, updating the data index "1" to a current data index "2", sending a message including a result of the request and the current data index "2" to load balancer 120, and sending a message including the result of the request and the current data index "2" to distribution center 140.

Figure 3E:
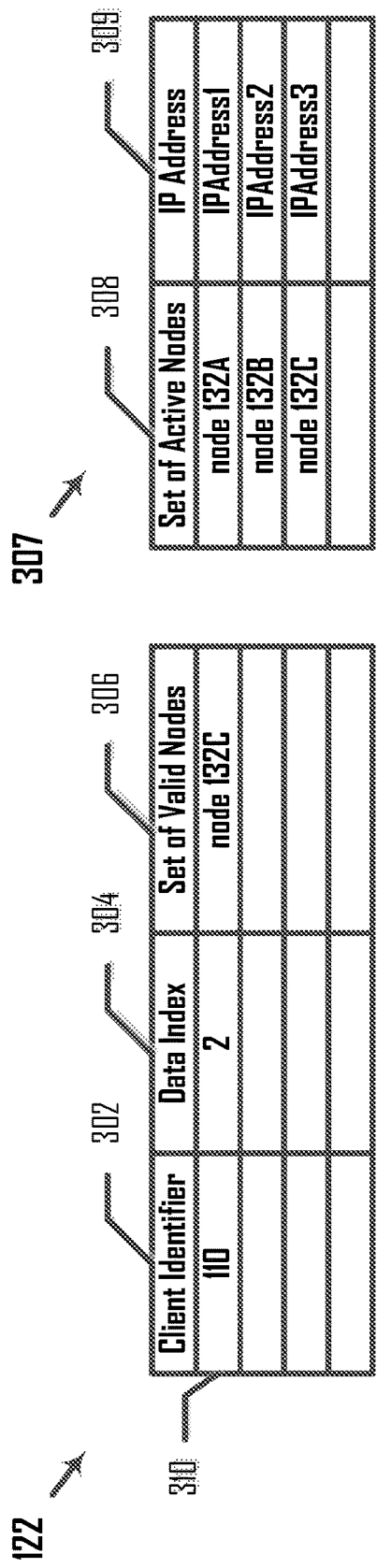

Load balancer 120 receives the message including the result of the request and the current data index "2" and updates index table 122. FIG. 3E illustrates index table 122 with updated entry 310, according to an embodiment. In the example illustrated in FIG. 3E, load balancer 120 has updated the data index in column "Data Index" 304 of entry 310 with the current data index "2" and has also updated column "Set of Valid Nodes" 306 to reflect that node 132C is the only node that stores the most current data associated with client 110 and current data index "2". As indicated by index table 122 in FIG. 3E, node 132C is the only valid node that can service a request from client 110. Accordingly, if client 110 sends another request, load balancer 120 may select node 132C (not node 132A) to service the request.

Distribution center 140 receives the data message including the result of the request and the current data index "2" and replicates the data message to one or more nodes in cluster 130. In an example, distribution center 140 replicates the data message to node 132B in cluster 130. Node 132B receives the message and stores the current data included in the data message in repository 132C. Node 132B may also store the current index "2" in repository 132B.

After node 132B stores the current data in repository 132B, node 132B may send a heartbeat message to distribution center 140 to indicate to distribution center 140 that the current data has been successfully stored in repository 132B and node 132B is ready to process requests from client 110. Distribution center 140 may replicate the heartbeat message to load balancer 120 in a different transaction from the transaction in which node 132C stores the current data in repository 132C, updates the data index, sends the message including the current data and the current data index to load balancer 120, and sends the data message including the current data and the current data index to distribution center 140. Accordingly, the exchange of data that is performed in these two transactions can be done asynchronously.

Figure 3F:
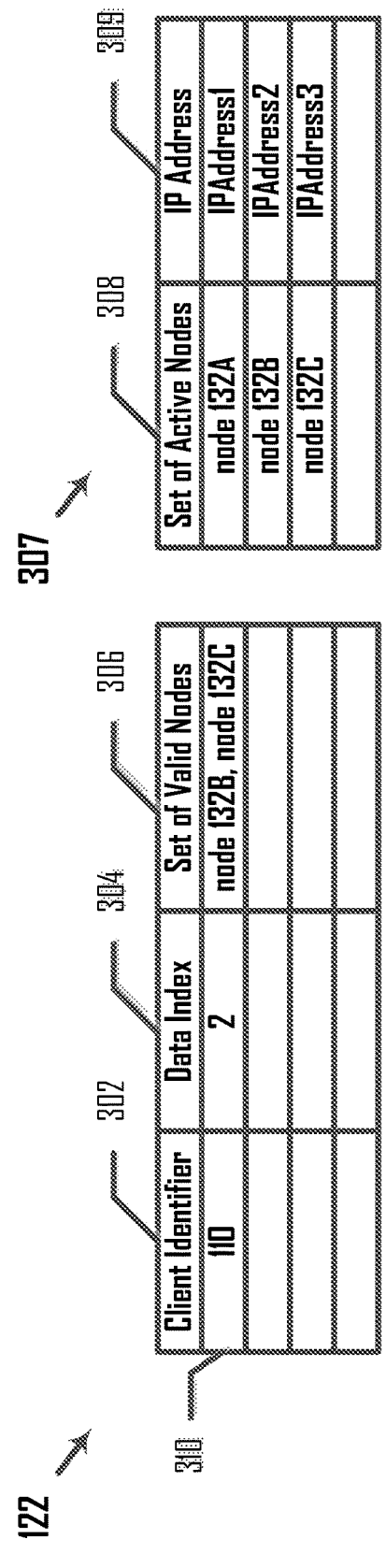

Load balancer 120 updates index table 122 with the information in the heartbeat message. FIG. 3F illustrates index table 122 with updated entry 310, according to an embodiment. In the example illustrated in FIG. 3F, load balancer 120 has updated column "Set of Valid Nodes" 306 to reflect that node 132B is a valid node that stores the current data and is capable of serving request from client 110. As indicated by index table 122 in FIG. 3F, nodes 132B and 132C are the only valid nodes that can serve a request from client 110. Accordingly, if client 110 sends another request, load balancer 120 may select node 132B or node 132C to service the request.

IV. Cluster Topology

A. New Node is Attached to the Cluster

Distribution center 140 may arrange an automatic discovery mechanism in cluster 130. When a new node joins cluster 130, the new node sends a heartbeat message to distribution center 140. The heartbeat message includes information about the new node's address. Distribution center 140 forwards the heartbeat message to load balancer 120. In response to receiving the heartbeat message, load balancer 120 tries to create a connection (e.g., Transmission Control Protocol (TCP) or User Datagram Protocol (UDP) connection) to the new node. If the connection is successfully established, load balancer 120 includes the new node in table 307 as an active node and the new node thus becomes a part of cluster 130. The new node may start to consume data synchronization messages from distribution center 140 and send heartbeat messages back to distribution center 140, as described in the present disclosure. Accordingly, a new node may join cluster 130 by simply knowing the address of the distribution center 140 (e.g., server 142A's IP address) and sending a heartbeat message to the address.

It may be desirable to propagate the current status of the data in cluster 130 to the new node while not overloading the new node with old data updates. To reduce overloading the new node with old data updates, a data message may have a limited life span. It may be unnecessary for the new node to process all the replicated data form the past which is not valid anymore. In an example, the data message may be configured to include a maximum age to which the data message may live. In an example, the maximum age is 15 minutes. This is merely an example, and the maximum age of a data message may vary.

Distribution center 140 may determine whether a data message is older than its configured maximum age. In response to determining that the data message is older than its configured maximum age, distribution center 140 may drop the data message from the system. Accordingly, the old data message is not delivered to the new node. Including the maximum age in a data message may prevent overloading of a new node that joins cluster 130. Additionally, the time to set up the new node in cluster 130 may be reduced.

B. Load Balancer Looses Connection with Node in the Cluster

Load balancer 120 may lose its connection to a node in cluster 130. If load balancer 120 loses its connection to a node in cluster 130, load balancer 120 may automatically remove the node from table 307 as an active node and stop routing client requests to the node. When the node comes back online, the node may send a heartbeat message to distribution center 140 and may also start to consume data messages from distribution center 140 to synchronize the node's data with the other nodes in cluster 130. Distribution center 140 forwards the heartbeat message to load balancer 120, which includes the node back into table 307 as an active node with information about the received combinations of data index and client identifiers.

If a data message has a maximum age, the reconnected node is not overloaded with a large number of data messages because the older data messages have been dropped by distribution center 140 and are not forwarded to the reconnected node.

V. Example Method

Figure 4:
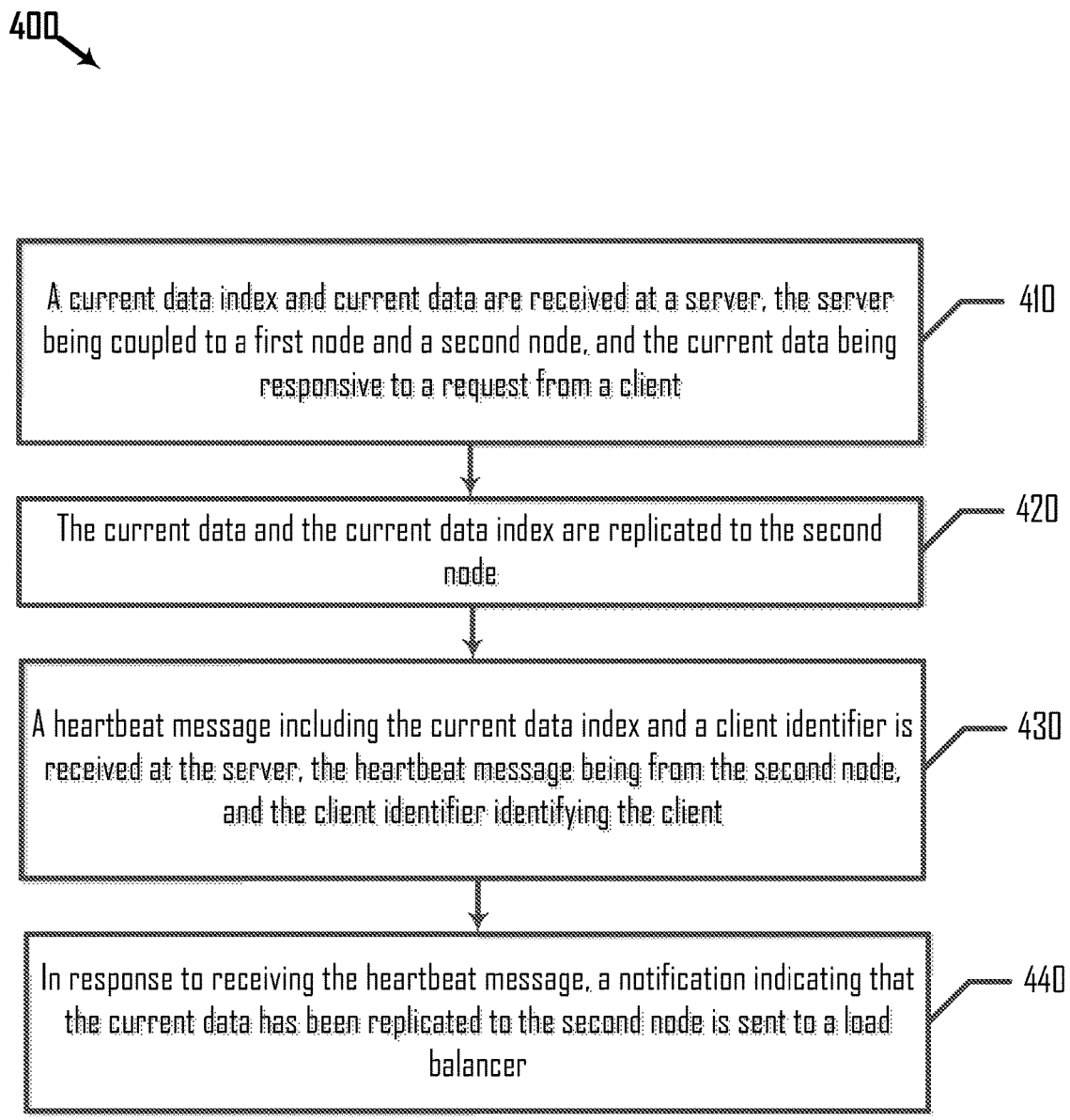
FIG. 4 is a flowchart illustrating a method of replicating data in a cluster including a plurality of nodes, according to an embodiment.

FIG. 4 is a flowchart illustrating a method 400 of replicating data in a cluster including a plurality of nodes. Method 400 is not meant to be limiting and may be used in other applications.

Method 400 includes blocks 410-440. In a block 410, a current data index and current data are received at a server, the server being coupled to a first node and a second node, and the current data being responsive to a request from a client. In an example, server 142A receives the current data index and current data 210, server 142A being coupled to node 132A and node 132B, and current data 210 being responsive to a request from client 110.

In a block 420, the current data and the current data index are replicated to the second node. In an example, server 142A replicates current data 210 and the current data index "1" to node 132B. Node 132A may send current data 210 and the current data index to server 142A so that server 142A replicates current data 210 and the current data index to one or more other nodes in cluster 130.

In a block 430, a heartbeat message including the current data index and a client identifier is received at the server, the heartbeat message being from the second node, and the client identifier identifying the client. In an example, server 142A receives heartbeat message 224 including the current data index and client identifier "110", heartbeat message 224 being from node 132B, and the client identifier "110" identifying client 110.

In a block 440, in response to receiving heartbeat message 224, a notification indicating that current data 210 has been replicated to node 132B is sent to load balancer 140. In an example, in response to receiving heartbeat message 224, server 142A sends a notification indicating that current data 210 has been replicated to node 132B to load balancer 140. In an example, the notification is heartbeat message 224. In such an example, server 142A may receive heartbeat message 224 and forward it to load balancer 120. In another example, server 142A performs some type of processing on heartbeat message 224 and sends a message including the information in heartbeat message 224 to load balancer 120.

It is also understood that additional processes may be performed before, during, or after blocks 410-440 discussed above. It is also understood that one or more of the blocks of method 400 described herein may be omitted, combined, or performed in a different sequence as desired.

VI. Example Computing System

Figure 5:
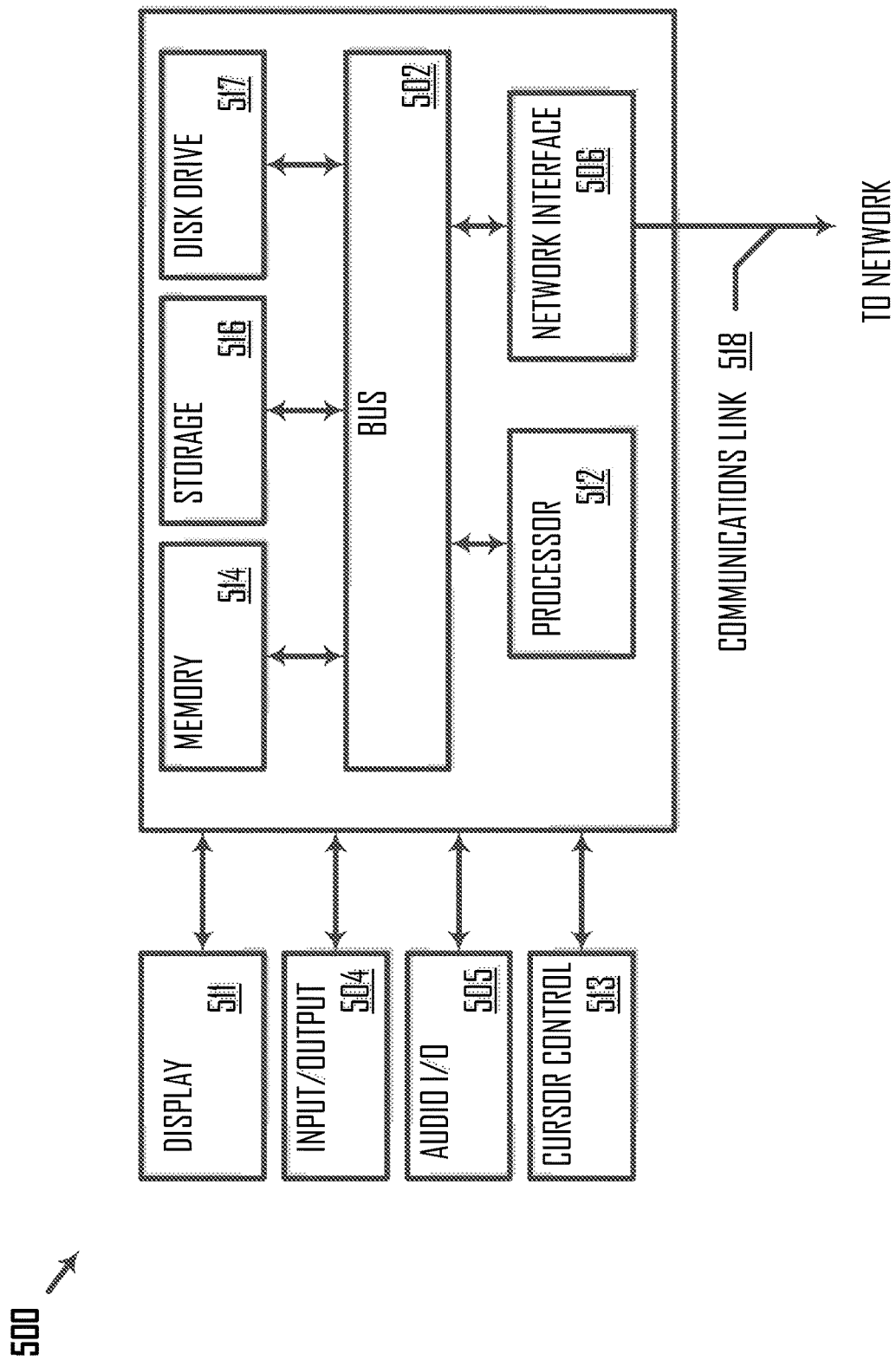
FIG. 5 is a block diagram of an electronic system suitable for implementing one or more embodiments of the present disclosure.

FIG. 5 is a block diagram of a computer system 500 suitable for implementing one or more embodiments of the present disclosure. In various implementations, each of load balancer 120, nodes 132A-132C, and servers 142A-142C may be a computing device that includes one or more processors and may additionally include one or more storage devices each selected from a group including a floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read. The one or more storage devices may include stored information that may be made available to one or more computing devices and/or computer programs (e.g., clients) coupled to the computing device using a computer network (not shown). The computer network may be any type of network including a LAN, a WAN, an intranet, the Internet, a cloud, and/or any combination of networks thereof that is capable of interconnecting computing devices and/or computer programs in the system.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons or links, etc., and sends a corresponding signal to bus 502. I/O component 504 may also include an output component such as a display 511, and an input control such as a cursor control 513 (such as a keyboard, keypad, mouse, etc.).

An optional audio input/output component 505 may also be included to allow a user to use voice for inputting information by converting audio signals into information signals. Audio I/O component 505 may allow the user to hear audio. A transceiver or network interface 506 transmits and receives signals between computer system 500 and other devices via a communication link 518 to a network. In an embodiment, the transmission is wireless, although other transmission mediums and methods may also be suitable. A processor 512, which may be a micro-controller, digital signal processor (DSP), or other processing component, processes these various signals, such as for display on display 511 coupled to computer system 500 or transmission to other devices via communication link 518. Processor 512 may also control transmission of information, such as cookies or IP addresses, to other devices. Components of computer system 500 also include a system memory component 514 (e.g., RAM), a static storage component 516 (e.g., ROM), and/or a disk drive 517.

Computer system 500 performs specific operations by processor 512 and other components by executing one or more sequences of instructions contained in system memory component 514. Logic may be encoded in a computer readable medium, which may refer to any medium that participates in providing instructions to processor 512 for execution. Such a medium may take many forms, including but not limited to, non-volatile media, volatile media, and transmission media. In various implementations, non-volatile media includes optical, or magnetic disks, or solid-state drives, volatile media includes dynamic memory, such as system memory component 514, and transmission media includes coaxial cables, copper wire, and fiber optics, including wires that include bus 502. In an embodiment, the logic is encoded in non-transitory computer readable medium. In an example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences (e.g., method 400) to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also where applicable, the various hardware components and/or software components set forth herein may be combined into composite components including software, hardware, and/or both without departing from the spirit of the present disclosure. Where applicable, the various hardware components and/or software components set forth herein may be separated into sub-components including software, hardware, or both without departing from the spirit of the present disclosure. In addition, where applicable, it is contemplated that software components may be implemented as hardware components, and vice-versa.

Application software in accordance with the present disclosure may be stored on one or more computer readable mediums. It is also contemplated that the application software identified herein may be implemented using one or more specific purpose computers and/or computer systems, networked and/or otherwise. Where applicable, the ordering of various actions described herein may be changed, combined into composite actions, and/or separated into sub-actions to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Changes may be made in form and detail without departing from the scope of the present disclosure. Thus, the present disclosure is limited only by the claims.

We claim:

1. A method of replicating data, comprising:
   receiving at a server a first current data index and first current data, the server being coupled to a first node and a second node, the first current data being responsive to a first request from a client, and the first current data index being updated by the first node;
   replicating the first current data and the first current data index to the second node;
   receiving at the server a heartbeat message including the first current data index and a client identifier, the heartbeat message being from the second node and being an acknowledgement from the second node that the first current data has been stored at a repository local to the second node, and the client identifier identifying the client;
   in response to receiving the heartbeat message, sending a notification indicating that the first current data has been replicated to the second node to a load balancer; and
   receiving at the server a second current data index and second current data, the second current data being responsive to a second request from the client, and the second current data index being updated by the second node and being a value indicating that a node associated with the first current data index has stale data in relation to the second request.

2. The method of claim 1, further including:
   updating, at the first node, an old data index to the first current data index;
   storing, at the first node, the first current data in a repository local to the first node;
   sending, from the first node to the load balancer, a response to the first request; and
   sending a data message including the first current data index and first current data to a distribution center, wherein the updating, the sending a response to the first request, and the sending a data message includes during a first transaction, updating the old data index, sending the response to the first request, and sending the data message.

3. The method of claim 2, wherein the replicating includes during a second transaction different from the first transaction, replicating the first current data and the first current data index to the second node.

4. The method of claim 2, further including:
receiving at the load balancer the first request from the client;
determining whether the client identifier that identifies the client is stored in a first table, the first table including a set of associations between a client identifier, data index, and a set of valid nodes to which to forward a request from the client, and a valid node being a node that stores the first current data associated with the client;
in response to determining that the client identifier is stored in the first table, selecting a node of the set of valid nodes associated with the client to which to forward the first request;
sending a first message including the first request and the old data index to the selected node;
updating the set of valid nodes associated with the client to include the selected node;
receiving at the load balancer the first current data index and the first current data, the first current data index and the first current data being sent from the selected node, wherein the selected node processes the request from the client to obtain the first current data; and
in response to receiving the first current data index and the first current data:
forwarding the first current data to the client; and
updating the old data index stored in the first table with the first current data index.

5. The method of claim 1, further including:
receiving at the load balancer the notification, the notification including the second node's address, the first current data index, and the client identifier; and
in response to receiving the notification, updating the set of valid nodes in the first table to include the second node.

6. The method of claim 1, wherein the receiving a first current data index and first current data includes receiving a data message including the first current data index, first current data, and a maximum age, the method further including:
determining whether the data message is older than the maximum age; and
in response to determining that the data message is older than the maximum age, dropping the data message.

7. A system for replicating data, comprising:
a cluster including a first node and a second node, wherein the first node manages a first repository that is local to the first node, and the second node manages a second repository that is local to the second node;
a load balancer that receives one or more heartbeat messages; and
a distribution center including one or more servers coupled to one or more nodes in the cluster, wherein a server in the distribution center receives a first current data index and first current data from the first node, replicates the first current data and the first current data index to the second node, and receives a heartbeat message including the first current data index and a client identifier from the second node, wherein the heartbeat message is an acknowledgement from the second node that the first current data has been stored at the second repository, wherein the current data is responsive to a first request from a client that is identified by the client identifier, wherein in response to receiving the heartbeat message, the distribution center sends a notification indicating that the first current data has been replicated to the second node to the load balancer,
wherein the first current data index is updated by the first node, the server receives a second current data index and second current data, the second current data is responsive to a second request from the client, and the second current data index is updated by the second node and is a value indicating that a node associated with the first current data index has stale data in relation to the second request.

8. The system of claim 7, wherein during a transaction, the first node updates an old data index to the first current data index, stores the first current data in the first repository, sends a response to the client request to the load balancer, and sends the first current data index and first current data to the distribution center.

9. The system of claim 8, wherein during a second transaction different from the first transaction, the distribution center replicates the first current data and the first current data index to the second node.

10. The system of claim 7, wherein the distribution center includes a plurality of servers that implements a messaging application programming interface (API), and the first node in the cluster invokes the messaging API to communicate with the server in the distribution center.

11. The system of claim 10, wherein the server in the distribution center implements a Java Messaging System (JMS) API, and the first node in the cluster is a JMS client.

12. The system of claim 10, wherein the distribution center receives the heartbeat message based on the second node invoking the messaging API at the server in the distribution center.

13. The system of claim 7, wherein the distribution center sends the first current data and the first current data index to a multicast address to which a multicast group subscribes, and wherein the multicast group includes the second node.

14. The system of claim 7, wherein the load balancer maintains an index table including a set of entries, wherein each entry includes an association between a client identifier that identifies a client, and the load balancer further maintains a set of valid nodes in the cluster that is capable of serving requests from the client, and wherein the set of valid nodes stores up-to-date data associated with the client.

15. The system of claim 14, wherein the load balancer receives the first request from the client, identifies the first current data index that corresponds to the client identifier, selects, based on the associated current data index, a valid node that is capable of serving requests from the client, and sends the first request to the selected node.

16. The system of claim 7, wherein the distribution center replicates the second current data and the second current data index to a third node and receives a second heartbeat message including the second current data index and the client identifier from the third node, wherein the second heartbeat message is an acknowledgement from the third node that the second current data has been stored at a repository local to the third node.

17. The system of claim 16, wherein in response to receiving the second heartbeat message, the distribution center sends a second notification indicating that the second current data has been replicated to the third node to the load balancer.

18. The system of claim 16, wherein the first node is the third node.

19. The system of claim 16, wherein the first node is different from the third node.

20. A machine-readable medium comprising a plurality of machine-readable instructions that when executed by one or more processors is adapted to cause the one or more processors to perform a method comprising:
- receiving at a server a first current data index and first current data, the server being coupled to a first node and a second node, the first current data being responsive to a first request from a client, and the first current data index being updated by the first node;
- replicating the first current data and the first current data index to the second node;
- receiving at the server a heartbeat message including the first current data index and a client identifier, the heartbeat message being from the second node and being an acknowledgement from the second node that the first current data has been stored at a repository local to the second node, and the client identifier identifying the client;
- in response to receiving the heartbeat message, sending a notification indicating that the first current data has been replicated to the second node to a load balancer; and
- receiving at the server a second current data index and second current data, the second current data being responsive to a second request from the client, and the second current data index being updated by the second node and being a value indicating that a node associated with the first current data index has stale data in relation to the second request.

* * * * *